UNITED STATES PATENT OFFICE 2,139,321

PREPARATION OF PHENOL SULFIDES

Louis A. Mikeska, Westfield, and Eugene Lieber, Linden, N. J., assignors to Standard Oil Development Company, a corporation of Delaware No Drawing. Application August 21, 1936, Serial No. 97,196

19 Claims. (Cl. 260—608)

This application relates to an improved process for the preparation of phenol sulfides. It relates more particularly to the preparation of such sulfides by reaction of phenols with sulfur chlorides in an inert solvent with the simultaneous evolution and removal of hydrogen chloride under conditions adapted to favor the formation of improved yields of phenol sulfides of high purity and to avoid the formation of high molecular weight insoluble or resinous products.

It is already known that phenol and sulfur dichloride may be condensed in the presence of carbon disulfide. Such reaction is conducted at a low temperature. The yield of phenol sulfide is low and the product is obtained in such an impure form that it requires extensive purification. It has now been found that if the reaction of phenol, particularly alkyl phenols, and sulfur chloride is conducted in suitable solvents at temperatures of about 60 to 140° C. and preferably at a temperature of about 80 to 110° C. yield of desired products is greatly increased and the products are of such high purity that crystalline products can be obtained merely by distillation of the crude reaction mixture. The following examples are presented to illustrate preferred modifications of this invention and are not intended to limit it in any way.

Example 1

125 grams of tertiary amyl phenol were dissolved in 500 cc. of ethylene chloride

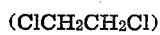
(ClCH$_2$CH$_2$Cl)

and the solution was heated to boiling under reflux. 40 grams (0.52 molal proportion) of sulfur dichloride (SCl$_2$) were dissolved in 100 cc. of ethylene chloride. This solution was added slowly, with stirring, to the boiling solution of amyl phenol. The hydrogen chloride gas evolved during the reaction was withdrawn from the reaction zone through the reflux condenser. When the addition of the sulfur dichloride solution was completed, the boiling of the reaction mixture under reflux was continued for six hours until no further emission of hydrogen chloride was detectable. By this means, all hydrogen chloride is removed and there is no need to wash the reaction product with water. The time of refluxing can be cut down by blowing an inert gas such as nitrogen or flue gas through the reaction mixture. This may be done during the reaction or after all the reagents have been added, as desired.

The solvent, ethylene chloride, was then removed from the reaction mixture by distillation and the resulting product was distilled under a vacuum of 3 mm. mercury absolute pressure. There were thus obtained (1) a fraction distilled below 230° C., consisting of 20 gms. of unreacted phenol, (2) a fraction distilled between 230 and 235° C., and consisting of 108 gms. of amyl phenol sulfide, and (3) 10 gms. of residue.

The yield of amyl phenol sulfide recovered as distillate was 92.1%, based on the amount of amyl phenol reacting. It is a clear bright yellow liquid which on standing or being seeded crystallizes to a light yellow solid. Both the liquid and solid forms are soluble in ether, alcohol, acetone, carbon disulfide, liquid hydrocarbons, hydrocarbon halides, petroleum oils and fractions thereof, including gasoline, kerosene, burning and Diesel oils and lubricating oils, and in most organic solvents.

The residue was easily removable from the distilling flask with ordinary organic solvents such as ether or chloroform. There was no coke formation.

The reaction is preferably conducted under anhydrous conditions. To insure this the first reflux condensate may be withdrawn until the stream is clear, when it is returned to the reaction zone. Instead of adding the sulfur chloride in solution in the solvent, the entire volume of solvent may be added initially or as desired, and the sulfur chloride may be added slowly to the reflux stream.

The equipment in which the reaction is conducted should be non-corrosive by the materials used and the reaction products. It is preferably made of or lined with glass or other acid and sulfur resistant ceramic material or metal, such as pure nickel and suitable alloys.

When the above process is conducted with carbon disulfide as the solvent during the reaction, the yield is less than 50% and the product is very impure and non-crystalline. Much coke is formed when its distillation is attempted.

The above example illustrates the preparation of an alkyl phenol sulfide, using sulfur dichloride as the reagent. Polymers of the alkyl phenol sulfide may be obtained by using a slightly larger ratio of sulfur dichloride to alkyl phenol, preferably a ratio in the approximate range from 0.6 to 0.75. In this manner, there is obtained as the reaction product a mixture of alkyl phenol sulfide and of polymers thereof, of which the polymers may amount to from 10 to 30% of the mixture. For example, when using a ratio of 0.4 mol of sulfur dichloride to 1 mol of alkyl phenol, the resulting product consists substantially entirely of alkyl phenol sulfide. When using a ratio of 0.5, the resulting product contains about 90% alkyl phenol sulfide and about 10% of a polymer thereof. When using a ratio of 0.75, the product contains about 70% of alkyl phenol sulfide and about 30% of polymers thereof. When using larger proportions, products are formed which are not soluble in petroleum lubricating oils. The polymers, as illustrated in Example 1, may be separated from the reaction mixture by distilling off the alkyl phenol sulfide under vacuum. Their formation is further illustrated in the following examples:

*Example 2*

The same procedure for conducting the reaction was used as in Example 1, except that 50 gms. of sulfur dichloride was used (0.65 molal ratio of sulfur dichloride to phenol). After removal of the solvent, the reaction mixture was distilled under vacuum to a temperature of 210° C. at an absolute pressure of 3 mm. mercury and there were obtained, as the distillation residue, 131 gms. of amyl phenol sulfides, representing a yield of 95.9% based on the amyl phenol reacted. This product was dark brown to red in color, and crystallized slowly on standing. It contained about 15% of non-distillable polymers of amyl phenol sulfide. These polymers are also soluble in the same solvents described in Example 1 as solvents for the amyl phenol sulfide.

The polymers may also be formed by bringing a phenol sulfide into reaction with additional sulfur halide. This is a preferred procedure when large yields of the polymer are desired. A suitable method of preparing the polymers is according to the process described in Example 1 The amount of sulfur dichloride used is preferably about half the amount (molal basis) of the phenol sulfide.

*Example 3*

Two mols of distilled tertiary amyl phenol sulfide, substantially free of unreacted phenols and of polymers, was brought into reaction with one mol of sulfur dichloride in ethylene chloride, boiling under reflux, according to the procedure described in Example 1. After distilling off the solvent from the reaction mixture, this was heated under a vacuum of 3 mm. mercury absolute pressure. No distillate was obtained to 250° C., indicating a theoretical yield of the polymer. This product is a dark red viscous liquid and is readily soluble in the materials listed as solvents for the alkyl phenol sulfide product in Example 1.

Instead of the sulfur dichloride reagent, sulfur monochloride ($S_2Cl_2$) may be substituted in the processes described in Examples 1 and 2 for the production of phenol disulfides and polymers thereof. It may also be substituted for sulfur dichloride in the process described in Example 3 to produce polymers of phenol sulfides in which the original molecules are joined together by a disulfide linkage. Other combinations of these two sulfur halide reagents may be used. For example, phenol disulfides may be brought into reaction with sulfur dichloride with the formation of polymers in which the original phenol disulfide molecules are linked by a single atom of sulfur. The preferred proportions of sulfur monochloride are the same as those indicated for use with sulfur dichloride.

*Example 4*

One mol of butyl phenol is brought into reaction with ½ mol of sulfur monochloride under the same conditions described in Example 1. The solvent and any unreacted butyl phenol are removed by distillation. The residual product is largely butyl phenol disulfide, with a small amount of polymers. It is not distillable. It is soluble in the same solvents described as solvents for the product of Example 1, including petroleum oil and fractions thereof from gasolines to lubricating oils.

A convenient method for handling the reaction products, especially when the alkyl phenol sulfides are to be used in blends with mineral oils, is to add a petroleum lubricating oil during or after the removal of solvent by distillation at atmospheric pressure. Any amount of oil may be used, ½ to 2 volumes of oil per volume of the alkyl phenol sulfide being usually satisfactory. Any remaining solvent and unreacted phenols are then easily removed by distillation without danger of overheating the desired product. The last traces of solvent may be removed by heating the oil to about 100° C. under a vacuum below 100 mm. mercury, and preferably below 20 to 10 mm. The last traces of hydrogen sulfide may also be removed from the reaction product by blowing it with an inert gas, either during or after the above described distillations. Air may be used, preferably at atmospheric temperature, although temperatures up to about 100° C. or higher may be used.

The present invention may be used to prepare phenol sulfides from phenol and both cyclic and aliphatic derivatives thereof such as naphthols, cresols and higher alkylated derivatives containing one or more alkyl groups of two or more carbon atoms each attached to the aromatic nucleus. Other derivatives of phenols may be used in which other substituent groups may be attached to the aromatic nucleus in addition to or in substitution for the alkyl and aryl groups, provided only that the additional substituent groups do not greatly alter the nature of the reaction. The invention is particularly suited to the preparation of alkyl phenol sulfides from alkyl phenols containing alkyl groups of about 2 to 8 carbon atoms such as butyl phenols, amyl phenols, hexyl phenols and the like and from mixtures of such phenols. Suitable branched alkyl phenols, i. e., in which the carbon atom of the alkyl group connected to the benzene ring is also connected to at least two other carbon atoms of the alkyl group, can be prepared by condensing phenols with olefins of about 3 to 8 or more carbon atoms per molecule, or with mixtures of olefins, such as those obtained by the cracking or dehydrogenation of hydrocarbons, petroleum oils, etc. Ortho and para secondary and tertiary butyl and amyl phenols are preferred initial reagents. These may be used separately or in any desired mixture. The invention is also applicable to the preparation of phenol sulfides from polyhydroxy aromatics such as resorcinol, hydroquinone and their alkylated derivatives.

The reaction is preferably conducted at a temperature of 80 to 110° C. The products obtained in this range of temperatures are of excellent color, and, excepting the polymers and disulfides, are distillable and can be obtained in crystalline form merely on distillation of the crude mixture. When using reaction temperatures below about 60° C. or above about 140° C., the products are obtained in a much lower yield, have a poor color, and cannot be obtained in crystalline form. The same disadvantages apply when using other solvents than the organic halides described, for example, when using carbon disulfide or naphtha.

The crude products may also, if desired, be subjected to further purification in addition to, or in combination with or in place of the distillations described above. Preparation of products of enhanced purity may be accomplished by fractional crystallization, by extraction or precipitation with selective solvents. Impurities may also be removed by treatment with suitable adsorptive agents, such as clay.

Solvents suitable for use in this invention are the organic halides which are inert or react only very slowly with the reagents used and which preferably have a boiling point within the range of temperatures indicated to be suitable for the reaction. Among such solvents may be mentioned, for example, ethylene chloride, carbon tetrachloride, chloroform, tetrachlorethane, both symmetrical and unsymmetrical, trichloroethane, trimethylene dichloride, dichlorpropane, propylene chloride, propylidene dichloride, acetone chloride, trichloro propane, dichloro pentane, phenyl chloride and the corresponding derivatives of the other halides, such as the bromides and iodides, which boil within the same range. The saturated alkyl halides, boiling between about 80 and 110° C., are the preferred solvents, although those boiling as low as 60° C. and as high as 140° C. may be used, as even their use permits substantial advantages over solvents boiling outside this range. Solvents of higher or lower boiling points may also be used if the reaction is conducted under suitably reduced or elevated pressure to cause the solvent to boil in the desired range, although this procedure involves difficulties in the removal of the hydrogen halide formed during the reaction and is accordingly not commonly used. The amount of solvent may vary over a wide range, and is preferably at least equal in volume to the alkyl phenol. Larger amounts, from two to five or ten volumes, are generally used.

The sulfur chloride or other sulfur halide used is preferably of high purity, although commercially pure grades containing a few percent of free sulfur may be used. Either sulfur chloride or sulfur dichloride may be used, depending on whether a phenol sulfide or disulfide is desired as the product. Mixtures of the two sulfur chlorides may also be used with either present in any proportion from 0 to 100%, there being thus obtained a corresponding mixture of a phenol sulfide and a phenol disulfide. A preferred mixture of sulfur chlorides contains from 10 to 35% of sulfur dichloride, the remainder being sulfur monochloride. It may be used in the same manner as the separate sulfur chlorides described in the above examples. The products, which are preferably obtained as a vacuum distillation residue, as in Example 2, are especially effective as oxidation and corrosion inhibitors.

The process of this invention is also suitable for the preparation of alkyl phenol derivatives of the other non-metallic elements of group 6 of the periodic system of higher atomic weight than sulfur by substitution of suitable halide reagents thereof for the sulfur chlorides in the reactions described above. For example, alkyl phenol selenides may be prepared under the same conditions described above by substituting selenium oxychloride ($SeOCl_2$) in place of sulfur chloride or dichloride.

This invention is not to be limited to any theoretical explanations of the reactions described or to any of the specific examples presented herein, all of which have been presented solely for purpose of illustration, but is limited only by the following claims, in which it is desired to claim all novelty insofar as the prior art permits.

We claim:

1. Improved process for preparing hydroxy aromatic sulfides comprising bringing a phenol free from carboxyl groups and a halide of a non-metallic element of Group VI into reaction at a temperature between 60 and 140° C. in an inert solvent boiling at the reaction temperature under reflux while removing the hydrogen halide formed.

2. Process according to claim 1, in which said reaction temperature is between 80 and 110° C.

3. Improved process for preparing hydroxy aromatic sulfides comprising bringing a phenol and a halide of a non-metallic element of Group VI, the ratio of the halide to the phenol being between the limits of 0.3 and 1.0, into reaction at a temperature between 60 and 140° C., in an inert solvent boiling at the reaction temperature under reflux while removing the hydrogen halide formed.

4. Process according to claim 1, in which said solvent is an organic halide.

5. Improved process for preparing hydroxy aromatic sulfides comprising bringing a phenol and a halide of a nonmetallic element of Group VI into reaction at a temperature between 60 and 140° C. in a saturated aliphatic halide solvent boiling between about 60 and 140° C., said solvent boiling at the reaction temperature under reflux while removing the hydrogen halide formed.

6. Process according to claim 1, in which said phenol is an alkyl phenol having an alkyl group of two or more carbon atoms.

7. Process according to claim 1, in which said phenol is an alkyl phenol having an alkyl group of four to six carbon atoms.

8. Process for preparing an alkyl phenol sulfide of the type $R(C_6H_4)OH.S(C_6H_4)OH.R'$, in which R and R' are alkyl groups of two or more carbon atoms comprising bringing the corresponding alkyl phenol and sulfur dichloride into reaction at a temperature of 60 to 140° C. in an inert organic halide solvent boiling at the reaction temperature under reflux while removing the hydrogen chloride formed during the reaction.

9. Process according to claim 8, in which the reaction is conducted with a ratio of sulfur dichloride to alkyl phenol within the limits of about 0.3 and 1.0.

10. Process according to claim 8, in which the said solvent is ethylene chloride.

11. Process for the production of polymers of alkyl phenol sulfides according to claim 8, in which the reaction is conducted with a ratio of sulfur dichloride to phenol within the limits of about 0.6 and 0.8, and the polymers are obtained as a residue on distilling the alkyl phenol sulfide.

12. Process for the preparation of polymers of alkyl phenol sulfides comprising bringing an alkyl phenol sulfide and a sulfur chloride into reaction at a temperature of 60 to 140° C. in a saturated alkyl halide solvent boiling at the reaction temperature under reflux and removing the hydrogen chloride formed during the reaction.

13. Process for preparing alkyl phenol disulfides of the type $R(C_6H_4)OH.S_2(C_6H_4)OH.R'$, in which R and R' are alkyl groups of two or more carbon atoms comprising bringing the corresponding alkyl phenols into reaction with sulfur monochloride at a temperature of 60 to 140° C. in an inert organic halide solvent boiling at the reaction temperature under reflux while removing the hydrogen chloride formed during the reaction.

14. Process according to claim 13, in which the molal ratio of sulfur monochloride to alkyl phenol is between the limits of 0.3 and 1.0.

15. Process for preparing tertiary amyl phenol sulfide comprising dissolving substantially 2 mols of tertiary amyl phenol and 1 mol of sulfur dichloride in separate portions of ethylene chloride, slowly bringing the solutions into contact while boiling the ethylene chloride under reflux and removing the hydrogen chloride, continuing the refluxing until no further liberation of hydrogen chloride is apparent and separating the resulting tertiary amyl phenol sulfide from the reaction mixture.

16. Process for preparing tertiary amyl phenol disulfide comprising dissolving substantially 2 mols of tertiary amyl phenol and 1 mol of sulfur monochloride in separate portions of ethylene chloride, slowly bringing the solutions into contact while boiling the ethylene chloride under reflux and removing hydrogen chloride, continuing the refluxing until no further liberation of hydrogen chloride is apparent and separating the resulting tertiary amyl phenol disulfide from the reaction mixture.

17. Improved process for preparing hydroxy aromatic sulfides, comprising bringing a phenol free of carboxyl groups and a chloride of sulfur into reaction at a temperature between 60 and 140° C. in an inert solvent boiling at the reaction temperature under reflux, and removing the hydrogen chloride formed.

18. Process for preparing an alkyl phenol sulfide, comprising bringing an alkyl phenol free of carboxyl groups and a sulfur chloride into reaction with a ratio of sulfur chloride to alkyl phenol within the limits of 0.3 and 1.0, at a temperature of 60 to 140° C. in an inert organic halide solvent boiling at the reaction temperature under reflux while removing the hydrogen chloride formed during the reaction.

19. Process for preparing an alkyl phenol sulfide comprising bringing an alkyl phenol free of carboxyl groups and a sulfur chloride, with a ratio of sulfur chloride to alkyl phenol within the limits of 0.3 and 1.0, into reaction at a temperature between 60 and 140° C. in a saturated, alkyl chloride solvent while removing the hydrogen chloride formed.

LOUIS A. MIKESKA.
EUGENE LIEBER.